US007936717B2

(12) United States Patent
Cho et al.

(10) Patent No.: US 7,936,717 B2
(45) Date of Patent: May 3, 2011

(54) APPARATUS AND METHOD FOR PERFORMING INITIAL NETWORK ENTRY IN BROADBAND WIRELESS COMMUNICATION SYSTEM

(75) Inventors: Min-Hee Cho, Suwon-si (KR); Jae-Hee Cho, Seoul (KR); Nam-Gi Kim, Suwon-si (KR); Hyoung-Kyu Lim, Seoul (KR); Hyon-Goo Kang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 631 days.

(21) Appl. No.: 12/051,601

(22) Filed: Mar. 19, 2008

(65) Prior Publication Data

US 2008/0232316 A1 Sep. 25, 2008

(30) Foreign Application Priority Data

Mar. 21, 2007 (KR) ........................ 10-2007-0027509

(51) Int. Cl.
*H04W 8/22* (2009.01)
*H04W 28/18* (2009.01)
*H04W 88/10* (2009.01)
*H04W 88/06* (2009.01)
*H04W 72/04* (2009.01)
*H04J 1/00* (2006.01)
*H04W 36/00* (2009.01)
*H04J 13/00* (2011.01)

(52) U.S. Cl. ........ 370/329; 370/282; 370/295; 370/338; 370/343; 370/349; 370/432; 370/437; 370/480; 455/450; 455/452.1; 455/451; 455/435.1

(58) Field of Classification Search .................. 370/203, 370/208, 210, 282, 295, 334, 335, 328, 329, 370/330, 331, 338, 342, 343, 344, 349, 432, 370/436, 437, 474, 475, 480; 455/435.1, 455/435.2, 450, 451, 452.1
See application file for complete search history.

(56) References Cited

U.S. PATENT DOCUMENTS

| 6,546,001 | B1* | 4/2003 | Semper et al. ................ 370/349 |
| 7,295,528 | B2* | 11/2007 | Ibrahim et al. ................ 370/310 |
| 7,327,700 | B2* | 2/2008 | Venkatesh et al. ............ 370/326 |
| 7,593,375 | B2* | 9/2009 | Seo et al. ...................... 370/338 |
| 2006/0023684 | A1* | 2/2006 | Seo et al. ...................... 370/338 |
| 2007/0025246 | A1 | 2/2007 | Pirzada et al. |
| 2007/0147424 | A1* | 6/2007 | Anigstein ..................... 370/469 |
| 2007/0218894 | A1* | 9/2007 | Harris et al. ............... 455/426.1 |

(Continued)

*Primary Examiner* — Chi H Pham
*Assistant Examiner* — Ahmed Elallam
(74) *Attorney, Agent, or Firm* — The Farrell Law Firm, P.C.

(57) ABSTRACT

An apparatus and method for performing initial network entry in a broadband wireless communication system are provided. A communication method includes broadcasting, by a Base Station (BS), a Downlink Channel Descriptor (DCD) message including information on a different Frequency Allocation (FA) of the BS using all FAs; connecting, by one of a plurality of Media Access Control (MAC) processors of a Mobile Station (MS), using an arbitrary FA of the BS; obtaining, by the MS, information on the different FA of the BS by analyzing the DCD message received using the arbitrary FA; and performing, by one or more of the remaining MAC processors of the MS, a network entry process using the different FA of the BS according to the different FA information. Accordingly, when an MS having a plurality of MAC addresses connects to a system that performs communication through multiple FAs, different MAC processors of the MS can perform initial network entry using different FAs in the same cell (or sector or BS) without collisions.

37 Claims, 11 Drawing Sheets

U.S. PATENT DOCUMENTS

2007/0230493 A1* 10/2007 Dravida et al. ............... 370/412
2008/0008141 A1* 1/2008 Tchigevsky et al. .......... 370/338
2008/0232267 A1* 9/2008 Kim et al. ..................... 370/252
2008/0232337 A1* 9/2008 Kim et al. ..................... 370/338

* cited by examiner

APPARATUS AND METHOD FOR PERFORMING INITIAL NETWORK ENTRY IN BROADBAND WIRELESS COMMUNICATION SYSTEM

PRIORITY

This application claims priority under 35 U.S.C. §119(a) to a Korean patent application filed in the Korean Intellectual Property Office on Mar. 21, 2007 and assigned Serial No. 2007-27509, the entire disclosure of which is hereby incorporated by reference.

BACKGROUND OF THE INVENTION

1. Field of the Invention

The present invention relates to an apparatus and method for performing initial network entry in a broadband wireless communication system. More particularly, the present invention relates to an apparatus and method in which a Mobile Station (MS) having a plurality of Media Access Control (MAC) addresses performs initial network entry without collisions in a system supporting multi-Frequency Allocation (FA) communication.

2. Description of the Related Art

Today, many wireless communication techniques are being proposed to achieve a high-speed mobile communication. Among them, an Orthogonal Frequency Division Multiplexing (OFDM) scheme is accepted as one of the most promising techniques for the next generation wireless communication systems. The OFDM scheme is expected to be widely used as a future wireless communication technique, and is currently used as a standard in the Institute of Electrical and Electronics Engineers (IEEE) 802.16-based Wireless Metropolitan Area Network (WMAN) known as the 3.5 generation technology.

The standard is being modified so that a communication system is being evolved to provide a high-speed data service in comparison with a legacy system or to address an implementation issue. In such a system evolution process, various systems may be present together in the same area according to a compatibility level with respect to the legacy system. For example, a new system further evolved from the legacy system may be installed in an area where an IEEE 802.16e system is installed. In this case, the new system has to be able to provide a service not only to a legacy Mobile Station (MS) but also to a new MS.

At present, an OFDM-base broadband wireless communication system has a structure which supports only an MS using a single bandwidth through one Frequency Allocation (FA). Therefore, in order to support a new MS using a wider bandwidth, which will be developed in the future, the FA used in the system needs to change to a new FA having a suitable bandwidth corresponding to the wider bandwidth. However, when the FA changes, the system cannot provide a service to a legacy MS using a narrow bandwidth. Therefore, there is a problem in that all legacy MSs have to be replaced while changing the FA used in the system. Accordingly, there is a need for a method which can support both the legacy MS using the narrow bandwidth and the new MS using the wide bandwidth in the process of evolving the wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting all Mobile Stations (MSs) each using different bandwidths in a broadband wireless communication system.

Another aspect of the present invention is to provide an apparatus and method for simultaneously using Frequency Allocations (FAs) each having fixed bandwidths in a broadband wireless communication system.

Another aspect of the present invention is to provide an apparatus and method for performing a network entry process for an MS using multiple FAs in a broadband wireless communication system.

Another aspect of the present invention is to provide an apparatus and method for negotiating capability of an MS using multiple FAs in a broadband wireless communication system.

Another aspect of the present invention is to provide an apparatus and method in which an MS using multiple FAs connects using a different FA in the same cell in a broadband wireless communication system.

Another aspect of the present invention is to provide an apparatus and method for providing multi-FA information of a cell to an MS in a broadband wireless communication system.

According to an aspect of the present invention, an MS apparatus in a broadband wireless communication system supporting MSs each using different bandwidths is provided. The apparatus includes a multi-FA controller for controlling a plurality of Media Access Control (MAC) processors to connect using different FAs of a Base Station (BS); a first MAC processor for first attempting to connect using a first FA of the BS under the control of the multi-FA controller and for obtaining information on a different FA of the BS by analyzing a message received using the first FA; and a second MAC processor for connecting using a second FA of the BS according to the different FA information.

According to another aspect of the present invention, a BS apparatus in a broadband wireless communication system supporting MSs each using different bandwidths is provided. The apparatus includes a plurality of communication units for independently performing physical-layer processing on different FAs; a plurality of MAC processors, corresponding to the respective communication units and having different MAC addresses, for obtaining multi-FA capability information and a different MAC address of an MS by analyzing a message received from the MS connected using a specific FA; and a multi-FA controller for mapping and managing a plurality of MAC addresses belong to the same MS and provided from the MAC processors.

According to another aspect of the present invention, a communication method of an MS in a broadband wireless communication system supporting MSs each using different bandwidths is provided. The method includes performing a network entry process on an arbitrary FA of a BS by one of a plurality of MAC processors for multi-FA communication; obtaining information on a different FA of the BS by analyzing a message received using the arbitrary FA; and performing the network entry process on the different FA of the BS by one or more of the remaining MAC processors by the use of the different FA information.

According to another aspect of the present invention, a communication method in a broadband wireless communication system supporting MSs each using different bandwidths is provided. The method includes broadcasting, by a BS, a Downlink Channel Descriptor (DCD) message including information on a different FA of the BS to all FAs; connecting, by one of a plurality of MAC processors of the MS, using an arbitrary FA of the BS; obtaining, by the MS, information on the different FA of the BS by analyzing the DCD message received using the arbitrary FA; and performing, by one or more of the remaining MAC processors of the MS, a network entry process on the different FA of the BS by using the different FA information.

According to another aspect of the present invention, a communication method of a BS in a broadband wireless communication system supporting MSs each using different bandwidths is provided. The method includes obtaining, by a plurality of MAC processors, multi-FA capability information and a different MAC address of the MS by analyzing a message received from the MS; and mapping and managing a plurality of MAC addresses of the MS.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

Hereinafter, a technique for supporting all Mobile Stations (MSs) each using different bandwidths in a broadband wireless communication system will be described. In particular, the present invention provides a method in which, when a new MS using a wide bandwidth performs communication by using multiple Frequency Allocations (FAs), the new MS performs a network entry process without errors.

In the following descriptions, an Orthogonal Frequency Division Multiplexing (OFDM)-based wireless communication system will be described as an example. However, the present invention may also apply to other communication systems using different access schemes, for example a Code Division Multiple Access (CDMA) scheme.

Figure 1A:
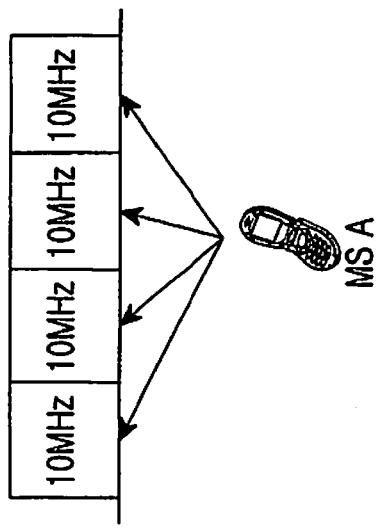
FIGS. 1A, 1B and 1C illustrate examples of a bandwidth changing process in a wideband wireless communication system.
Figure 1B:
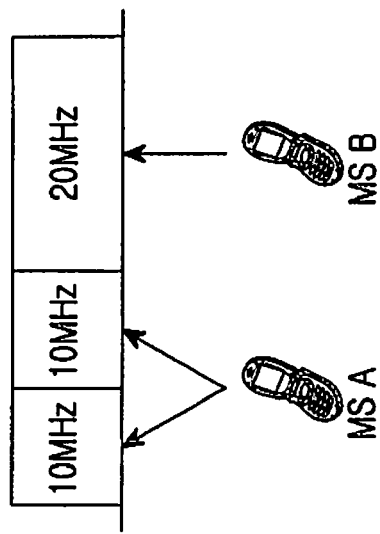
Figure 1C:
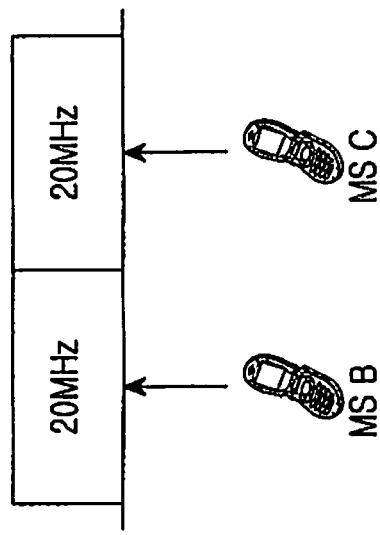

FIGS. 1A, 1B and 1C illustrate examples of a bandwidth changing process in a broadband wireless communication system. In FIGS. 1A to 1C, an MS A is a legacy MS capable of only narrow bandwidth communication, and an MS B and an MS C are new MSs capable of wide bandwidth communication.

FIG. 1A shows an example of bandwidth usage of a legacy system. Since the legacy MS A supports a bandwidth of 10 MHz, the system uses the entire bandwidth of 40 MHz by dividing it into four bandwidths of 10 MHz. Therefore, the legacy MS A can perform communication by using any one of the four bandwidths of 10 MHz.

FIG. 1B shows an example of bandwidth usage of an interim system. In order to provide services to both the legacy MS A supporting a bandwidth of 10 MHz and the new MS B supporting a bandwidth of 20 MHz, the system uses the entire bandwidth of 40 MHz by dividing it into two bandwidths of 10 MHz and one bandwidth of 20 MHz. Therefore, the legacy MS A can perform communication by using either one of the two bandwidths of 10 MHz, and the new MS B can perform communication by using the bandwidth of 20 MHz.

FIG. 1C shows an example of bandwidth usage of a future system. Since every MS uses a bandwidth of 20 MHz, the future system uses the entire bandwidth of 40 MHz by dividing it into two bandwidths of 20 MHz. Therefore, the new MSs B and C can perform communication by using either one of the two bandwidths of 20 MHz.

Figure 2C:
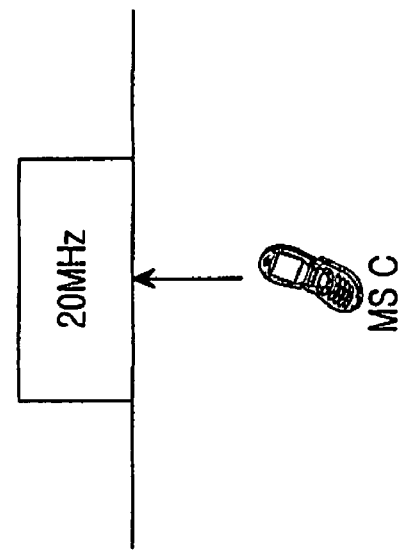
FIGS. 2A, 2B and 2C illustrate other examples of a bandwidth changing process in a wideband wireless communication system.
Figure 2B:
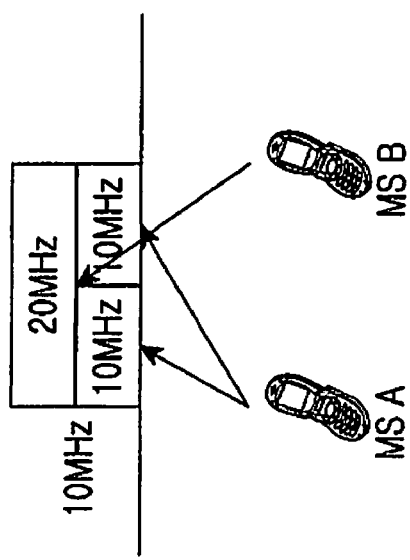
Figure 2A:
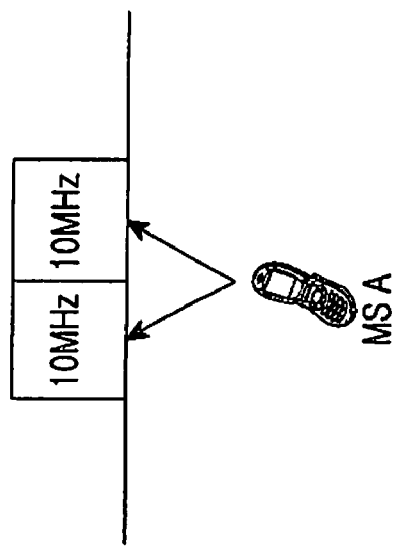

FIGS. 2A, 2B and 2C illustrate other examples of a bandwidth changing process in a broadband wireless communication system. In particular, unlike FIGS. 1A to 1C described above, FIGS. 2A, 2B and 2C show examples of bandwidth usage at an available bandwidth of 20 MHz. In FIGS. 2A to 2C, an MS A is a legacy MS using a narrow bandwidth, and an MS B and an MS C are new MSs using a wide bandwidth.

FIG. 2A shows an example of bandwidth usage of a legacy system. Since the legacy MS A supports a bandwidth of 10 MHz, the system uses the entire bandwidth of 20 MHz by dividing it into two bandwidths of 10 MHz. Therefore, the legacy MS A can perform communication by using either one of the two bandwidths of 10 MHz.

FIG. 2B shows an example of bandwidth usage of an interim system. In order to provide services both to the legacy MS A supporting a bandwidth of 10 MHz and the new MS B supporting a bandwidth of 20 MHz, the system first divides the entire bandwidth of 20 MHz into two bandwidths of 10 MHz. Then, a bandwidth of 20 MHz is frequency-overlaid on the two FAs of 10 MHz. Therefore, the legacy MS A can perform communication by using either one of the two FAs, and the new MS B can perform communication by simultaneously using the two FAs.

FIG. 2C shows an example of bandwidth usage of a future system. Since every MS uses a bandwidth of 20 MHz in the future, the future system uses the entire bandwidth of 20 MHz only for a new MS. That is, the new MS C can perform communication by using the bandwidth of 20 MHz.

In the descriptions of FIGS. 1A to 1C and FIGS. 2A to 2C, the new MS B of the interim system and the MS C of the future system are distinctively depicted. This is because different standards may be used even if the same bandwidth is supported.

The present invention relates to the interim system described in FIG. 2B. As shown in FIG. 2B, when the system supports both the legacy MS and the new MS by using a frequency overlay, a smaller bandwidth is required for the legacy MS and the new MS. Therefore, the present invention is further effective in terms of a frequency usage.

Figure 3:
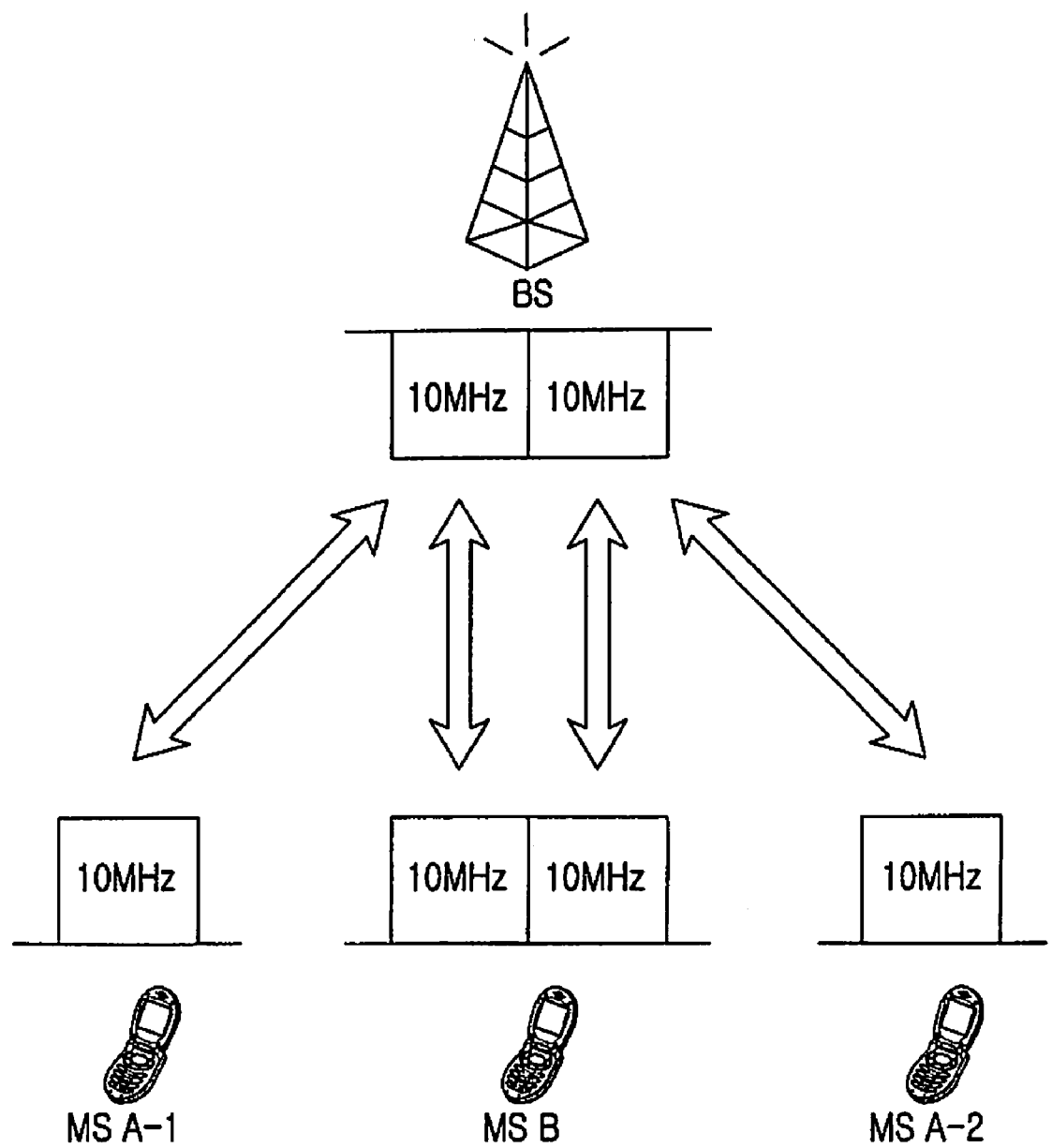
FIG. 3 illustrates an example of bandwidth usage when frequency overlay is used in a wideband wireless communication system according to the present invention.

FIG. 3 illustrates an example of bandwidth usage when frequency overlay is used in a broadband wireless communication system according to the present invention.

Referring to FIG. 3, a Base Station (BS) uses two FAs (i.e., FA#1 and FA#2) each having a bandwidth of 10 MHz. Although in this example the number of FAs is two, the BS may support at least two or more FAs. An MS A-1 is a legacy MS, and performs communication by using only one FA having a bandwidth of 10 MHz. An MS B is a new MS, and performs communication by simultaneously using two FAs each having a bandwidth of 10 MHz. Connections between the BS and the MS B are separately established for the respective FAs. The MS B maintains two connections through the two FAs, and performs communication by using a bandwidth of 20 MHz. As such, by using frequency overlay, the BS can simultaneously provide a service to the new MS and the legacy MS. In addition, since the two FAs are independently managed, the MS B may optionally perform communication by using only one FA similarly to the legacy MS.

In order to operate the two FAs in an independent manner, the BS and the MSs may perform communication by using an independent Media Access Control (MAC) address for each FA. That is, two MACs independently manage and operate network entry, context (e.g., CID, AK ID, SA ID, etc.), handover signaling, and so on. When the two FAs operate by using the different MAC addresses, modification of a standard can be minimized. In addition, a plurality of FAs for the multi-FA communication have to share one Internet Protocol (IP) address since one MS is recognized by its upper layer even when multiple FAs are used.

Figure 4:
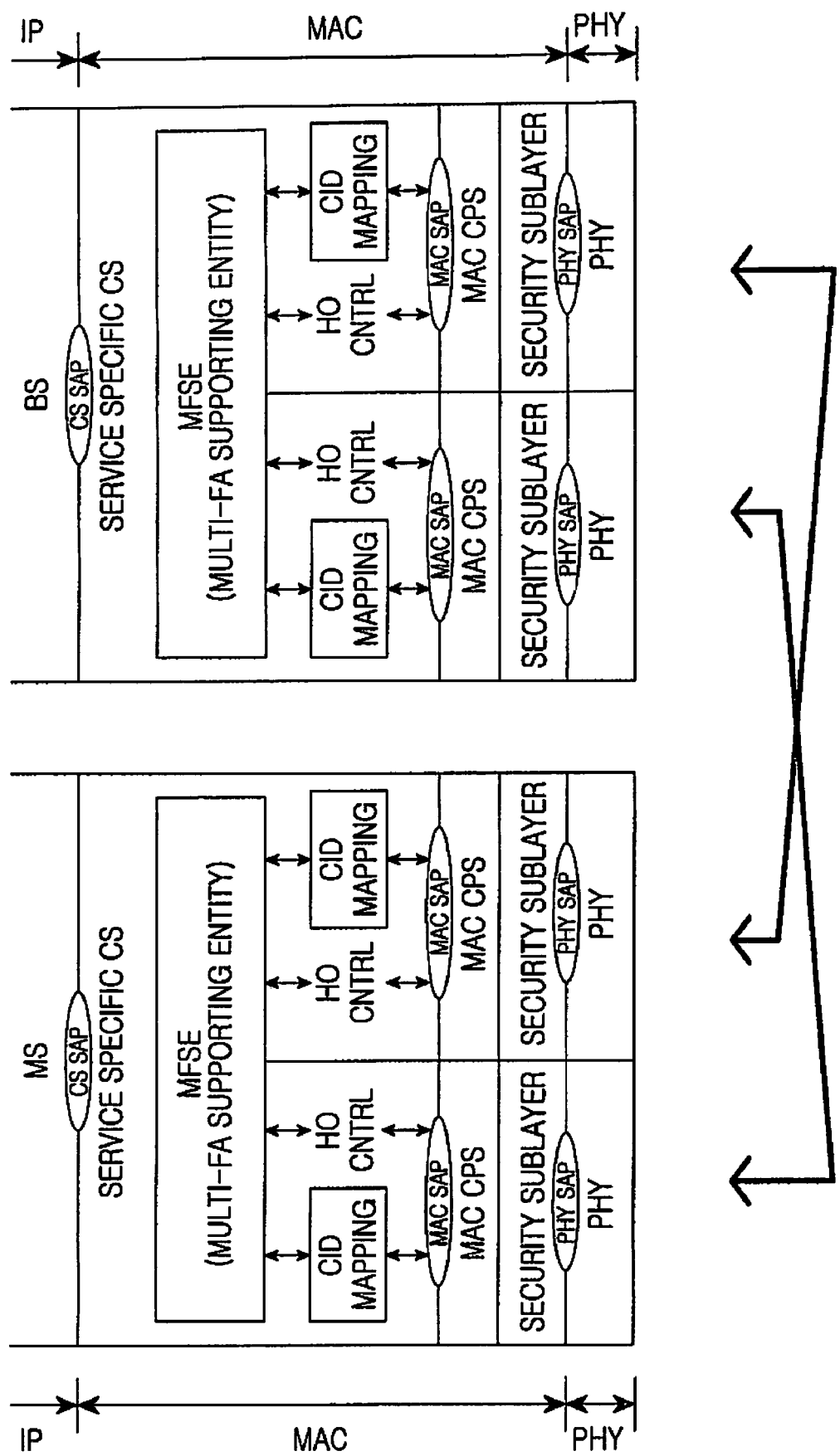
FIG. 4 illustrates a protocol stack configuration for supporting multiple Frequency Allocations (FAs) according to the present invention.

FIG. 4 illustrates a protocol stack configuration for supporting multiple FAs according to the present invention.

Referring to FIG. 4, the protocol stack configuration for supporting the multi-FA includes a PHYsical (PHY) layer and a Media Access Control (MAC) layer. The MAC layer includes a security sublayer, an MAC-Common Part Sublayer (CPS), and a Convergence Sublayer (CS). Basically, two PHY layers and two MAC layers exist to support two FAs. A Multi-FA Supporting Entity (MFSE) is included in the CS to coordinate multiple FAs. The location of the MFSE is depicted in the figure only as an example, and thus the MFSE may exist either in another layer (e.g., IP layer) or in an additional layer (or sublayer).

The respective layers will be described. The CS converts a service protocol of digital audio/video multicast, digital telephone, and Internet access to conform to an MAC protocol. Further, the CS converts an IP packet into an MAC Service Data Unit (SDU) having a specific Connection ID (CID) and delivers the MAC SDU to the MAC-CPS, and also converts the MAC SDU received from the MAC-CPS into an IP packet and delivers the IP packet to its superordinate layer (e.g., IP layer).

The MAC-CPS controls access to shared wireless media, and also controls flows of data and control signals according to a defined MAC protocol. The MAC-CPS forms an MAC Packet Data Unit (PDU) and a burst by using the MAC SDUs provided from the CS and delivers the burst data to its subordinate layer. The MAC-CPS extracts the MAC-SDUs from the data received from the subordinate layer and delivers the MAC-SDUs to the CS.

The security sublayer performs a security function such as authentication, encryption, and key management.

The PHY layer performs coding, modulation, Inverse Fast Fourier Transform (IFFT), and Radio Frequency (RF) modulation on the burst formed in the MAC-CPS. The PHY layer transmits the resultant data through a wireless link. The PHY layer performs RF demodulation, Fast Fourier Transform (FFT), demodulation, and decoding on a signal received through the wireless link, and delivers the resultant data to its superordinate layer.

The MFSE of the present invention controls multi-FA capability negotiation to determine whether multi-FA is supported between an MS and a BS. The MFSE distributes packets delivered from its superordinate layer through the respective multiple FAs, and gathers and integrates packets delivered from its subordinate layer into one IP address. In this case, the MFSE may perform packet distribution by using an IP fragmentation function. In addition, during handover, the MFSE provides control such that multiple FAs connected to the same MS can perform handover to the same target BS (or cell or sector).

The CID mapping function of the CS, the MAC-CPS function, the function of the security sublayer, and the function of the PHY layer are independently performed. A plurality of MAC-CPSs corresponding to the multiple FAs exchange a handover-related signal with the MFSE in an independent manner.

As such, in order for an MS having two or more MAC addresses to connect to two or more FAs, requirements of a network entry process are as follows.

The two or more MAC addresses of the MS have to be respectively connected to different FAs of the same cell (or sector or BS). For this, two or more MACs need to be coordinated. When a connection is attempted by each MAC without coordination, errors may occur in which MACs within the same MS are connected to different cells, or the MACs are connected to the same FA in the same cell.

In order to avoid such an error, the present invention provides a method in which, after one MAC is connected, information on a different FA in the same sector is obtained and provided to a different MAC so that the different MAC connects to the different FA. The information on the second FA in the same sector may be obtained through SS Basic Capability (SBC) negotiation, or through broadcasting messages such as a Downlink Channel Descriptor (DCD) message and a NeighBoR-ADVertisement (NBR-ADV) message.

The BS also has to know a plurality of MAC addresses belonging to the same MS. This information is used when the BS recognizes that different MAC addresses indicate the same MS. The present invention provides a method of exchanging information on a multi-FA capability and different MAC addresses of the same MS through the SBC negotiation process.

Figure 5:
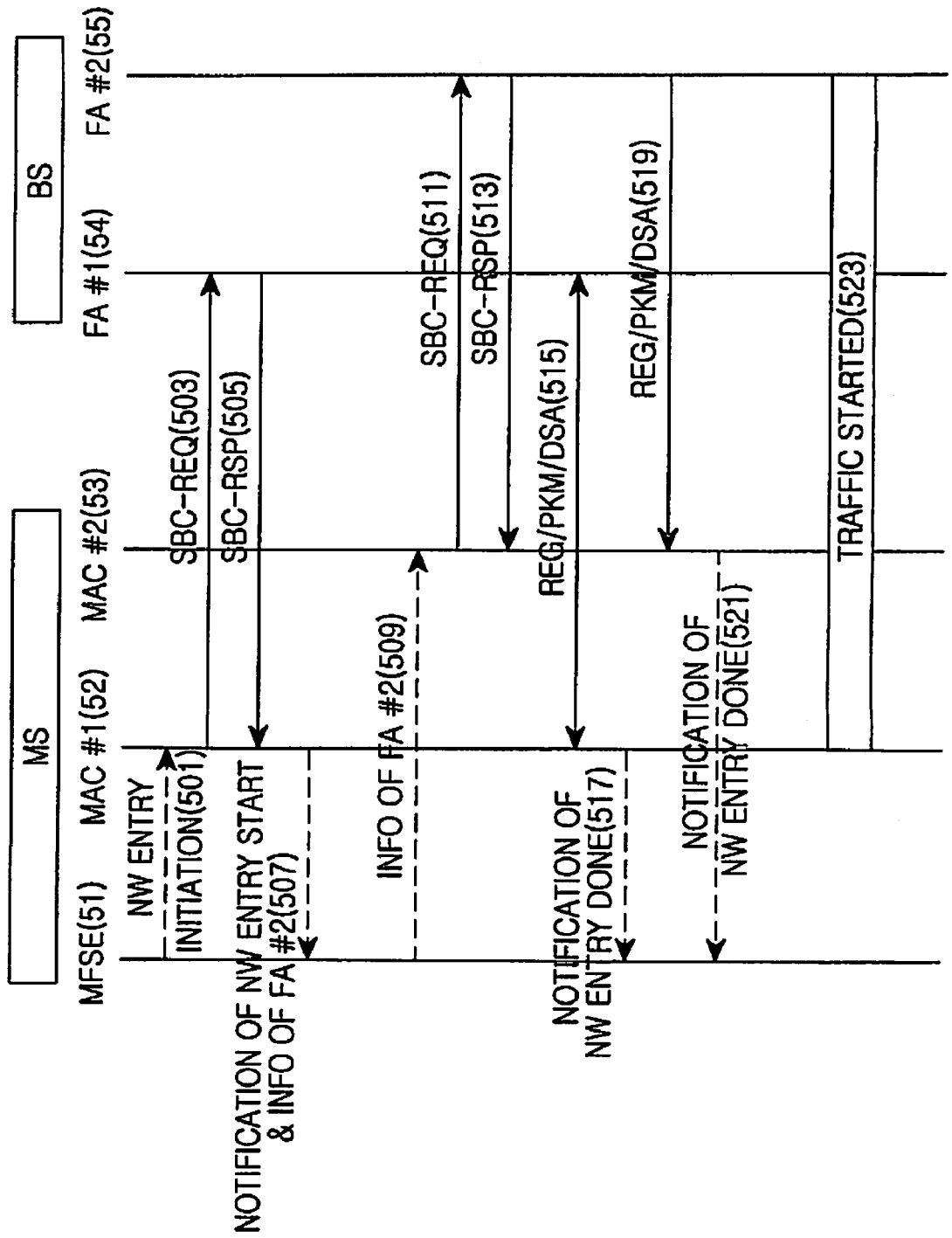
FIG. 5 illustrates a network entry process of a Mobile Station (MS) supporting multiple FAs in a wideband wireless communication system according to the present invention.

FIG. 5 illustrates a network entry process of an MS supporting multiple FAs in a broadband wireless communication system according to the present invention. Although it is assumed in FIG. 5 that two different MAC units of the MS are connected to a BS using two different FAs for convenience, the same may also apply when two or more MAC units are connected to the BS using two or more FAs. It will be assumed hereinafter that a first MAC unit 52 of the MS first attempts to connect to a first FA unit 54 of the BS. Herein, the FA unit 54 comprises a MAC layer and a PHY layer relative to a FA#1. Also, a FA unit 55 comprises a MAC layer and a PHY layer relative to a FA#2.

Referring to FIG. 5, an MFSE 51 of the MS instructs the first MAC unit 52 to perform initial Network (N/W) entry in step 501. In step 503, the first MAC unit 52 of the MS obtains synchronization of the first FA unit 54 of the BS, is subjected to an initial ranging process, and transmits to the BS an SS Basic Capability REQuest (SBC-REQ) message for SBC negotiation. The SBC-REQ message may include information indicating whether multi-FA is supported and information on a different MAC address of the MS. Such information may be added in the format of Type/Length/Value (TLV).

In step 505, the BS transmits an SBC-ReSPonse (RSP) message to the first MAC unit 52 of the MS in response to the SBC-REQ message. The SBC-RSP message may include information on a different FA (i.e., FA#2) in the same cell. The different FA information may include a DownLink (DL) center frequency (or FA index) of the FA and a preamble index.

In step 507, the first MAC unit 52 of the MS analyzes the SBC-RSP message received from the BS, and provides the different FA information of the BS to the MFSE 51. In step 509, the MFSE 51 delivers the different FA information of the BS to a second MAC unit 53.

In step 511, the second MAC unit 53 obtains synchronization of a second FA unit 55 by using the different FA information, is subjected to an initial ranging process, and transmits to the BS the SBC-REQ message for the SBC negotiation. The SBC-REQ message may include information indicating whether multi-FA is supported and information on a different MAC address of the MS. In step 513, the BS transmits the SBC-RSP message to the second MAC unit 53 of the MS in response to the SBE-REQ message. The SBC-RSP message may include information on a different FA (i.e., FA#1) in the same cell.

After completing the SBC negotiation process through step 503 and step 505, the first MAC unit 52 performs the remaining operations of the N/W entry process on the first FA unit 54 of the BS so as to establish a traffic connection in step 515. Examples using the remaining operations of the N/W entry process include a registration process, a Private Key Management (PKM) negotiation process, and a Dynamic Service Addition (DSA) process. Upon completing the N/W entry process, the first MAC unit 52 of the MS delivers an N/W_Entry_Done signal, which indicates the connection is established, to the MFSE 51 in step 517.

After the SBC negotiation process is completed through step 511 and step 513, the second MAC unit 53 performs the remaining operations of the N/W entry process on the second FA unit 55 of the BS so as to establish a traffic connection in step 519. Upon completing the N/W entry process, the second MAC unit 53 of the MS delivers the N/W_Entry_Done signal to the MFSE 51 in step 521.

After establishing the traffic connections respectively by the first MAC unit 52 and the second MAC unit 53, in step 523, the first MAC unit 52 exchanges traffic with the first FA unit 54 of the BS, and the second MAC unit 53 exchanges traffic with the second FA unit 55 of the BS.

Figure 6:
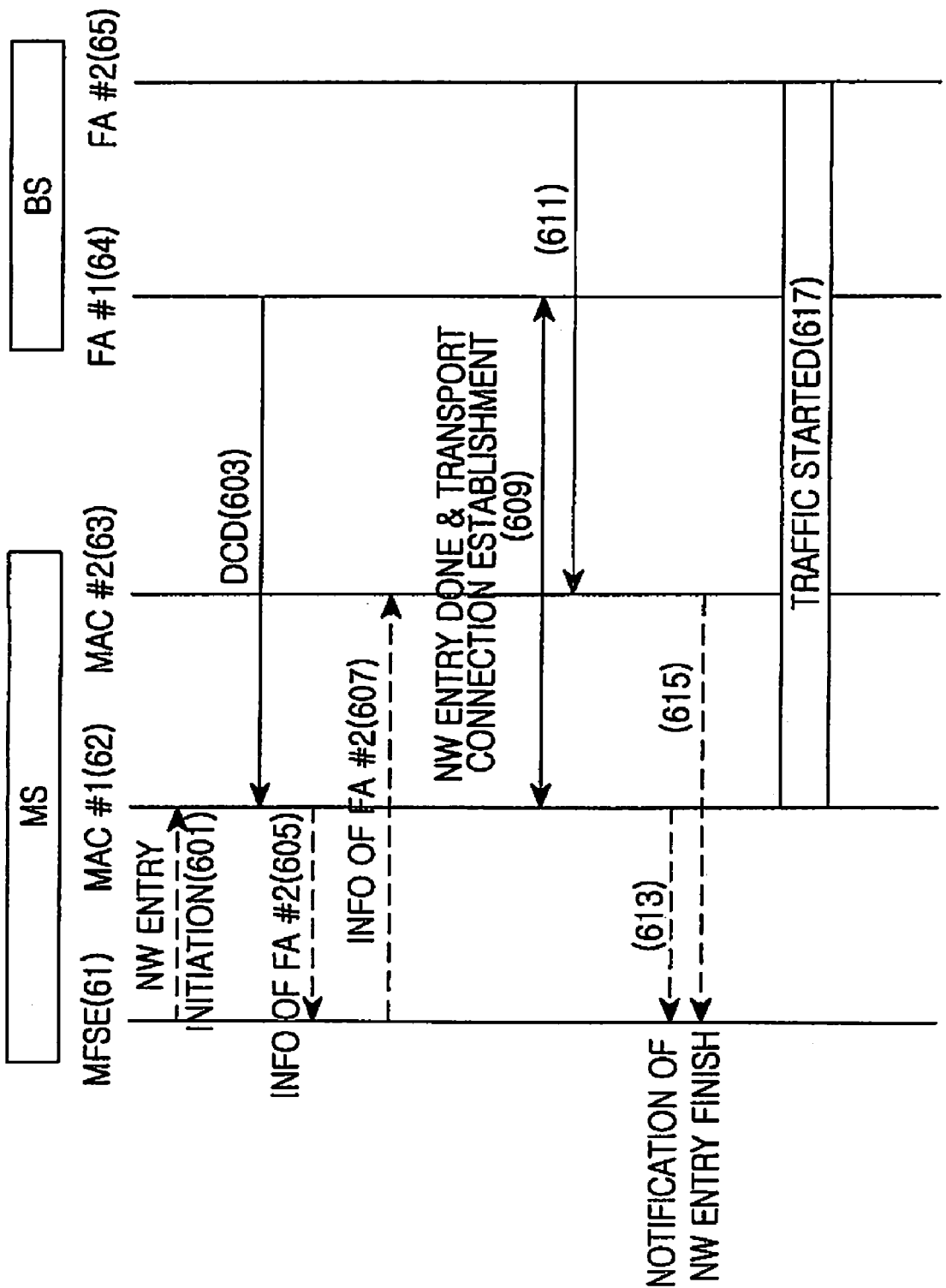
FIG. 6 illustrates a network entry process of an MS supporting multiple FAs in a wideband wireless communication system according to the present invention.

FIG. 6 illustrates a network entry process of an MS supporting multiple FAs in a broadband wireless communication system according to the present invention. In FIG. 6, the MS obtains information on a different FA in the same cell by using a DCD message. It will be assumed hereinafter that a first MAC unit 62 of the MS first attempts to connect to a first FA unit 64 of a BS.

Referring to FIG. 6, an MFSE 61 of the MS instructs the first MAC unit 62 to perform initial Network (N/W) entry in step 601. In step 603, the first MAC unit 62 obtains synchronization of the first FA unit 64 of the BS, and receives a MAP message and a DCD message. That is, the first MAC unit 62 obtains synchronization using a preamble signal of the first FA unit 64, evaluates the region of the DCD message using the MAP message, and receives the DCD message at the evaluated region. The DCD message may include information on a different FA (FA#2) in the same cell. The different FA information may include a DL center frequency (or FA index) of the FA and a preamble index.

In step 605, the first MAC unit 62 of the MS analyzes the DCD message received from the BS, and provides the different FA information of the BS to the MFSE 61. In step 607, the MFSE 61 delivers the different FA information of the BS to a second MAC unit 63.

Upon receiving the DCD message, in step 609, the first MAC unit 62 performs a predetermined N/W entry process to establish a traffic connection. During the N/W entry process, the first MAC unit 62 transmits an SBC-REQ message to the BS. The SBC-REQ message includes information indicating whether multi-FA is supported and also includes a different MAC address of the MS. The N/W entry process includes an initial ranging process, an SBC negotiation process, a registration process, a PKM process, and a DSA process.

Upon obtaining the different FA information of the BS, in step 611, the second MAC unit 63 also obtains synchronization of a second FA unit 65 by using the different FA information, and establishes a traffic connection by performing the predetermined N/W entry process. During the N/W entry process, the second MAC unit 63 transmits the aforementioned SBC-REQ message to the BS.

Upon completing the N/W entry process, in step 613, the first MAC unit 62 delivers an N/W_Entry_Finish signal to the MFSE 61. In step 615, the second MAC unit 63 delivers the N/W_Entry_Finish signal to the MFSE 61.

After establishing the traffic connections respectively by the first MAC unit 62 and the second MAC unit 63, in step 617, the first MAC unit 62 exchanges traffic with the first FA unit 64 of the BS, and the second MAC unit 63 exchanges traffic with the second FA unit 65 of the BS.

As shown in FIG. 6, there is an advantage in that first MAC unit 62 and the second MAC unit 63 almost simultaneously start the N/W entry process and complete the N/W entry process.

Figure 7:
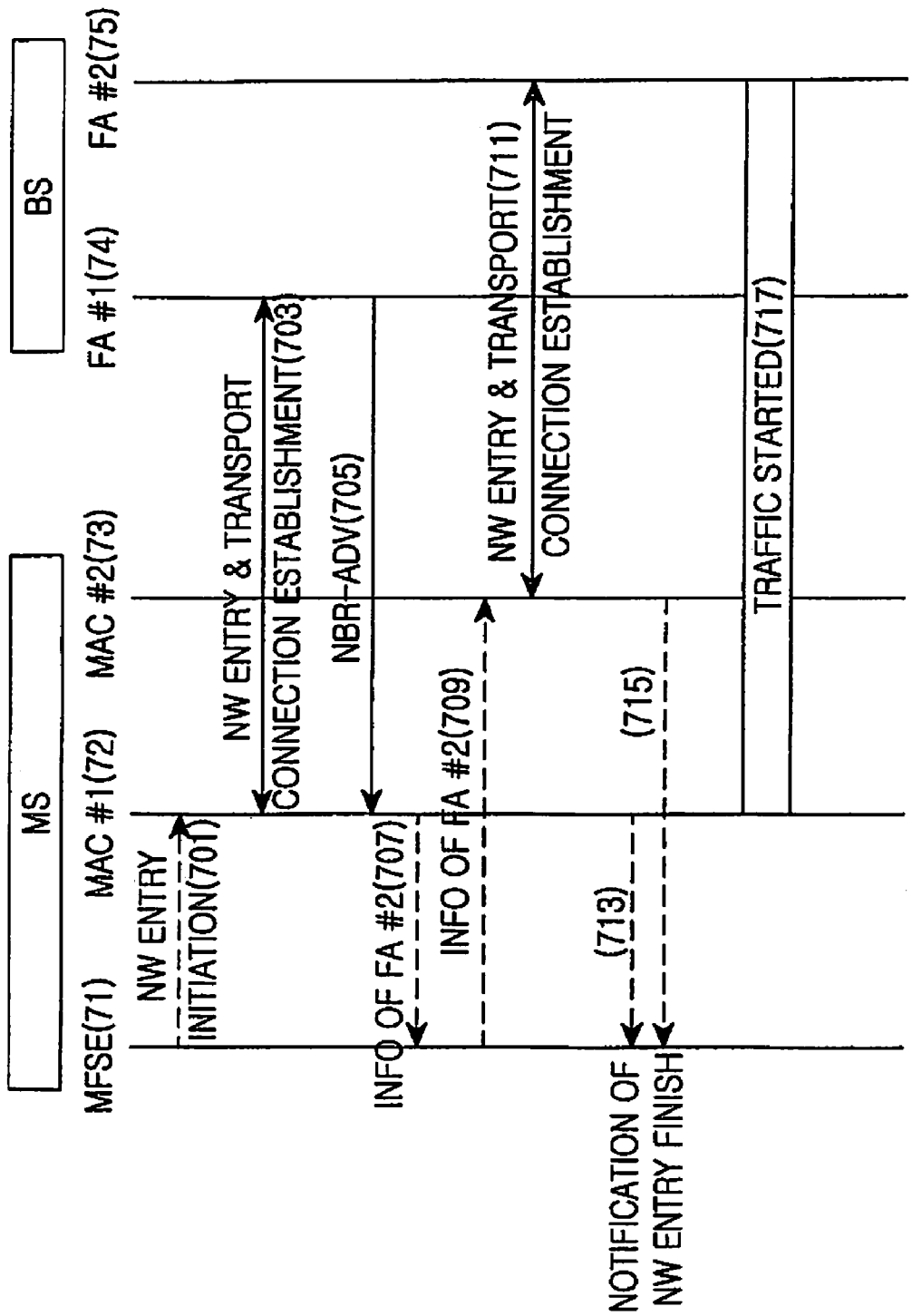
FIG. 7 illustrates a network entry process of an MS supporting multiple FAs in a wideband wireless communication system according to the present invention.

FIG. 7 illustrates a network entry process of an MS supporting multiple FAs in a broadband wireless communication system according to the present invention. In FIG. 7, information on a different FA in the same cell is obtained by using an NBR-ADV message. It will be assumed hereinafter that a first MAC unit 72 of the MS first attempts to connect to a first FA unit 74 of a BS.

Referring to FIG. 7, an MFSE 71 of the MS instructs to the first MAC unit 72 to perform initial Network (N/W) entry in step 701. In step 703, the first MAC unit 72 obtains synchronization of the first FA unit 74 of the BS, and performs a predetermined N/W entry process to establish a traffic connection. During the N/W entry process, the first MAC unit 72 transmits an SBC-REQ message to the BS. The SBC-REQ message includes information indicating whether multi-FA is supported and also includes a different MAC address of the MS. The N/W entry process includes an initial ranging process, an SBC negotiation process, a registration process, a PKM process, and a DSA process.

In step 705, the first MAC unit 72 analyzes an MAP message received from the BS to evaluate the region of an NBR-ADV message, and receives the NBR-ADV message at the evaluated region. The NBR-ADV message may include information on a different FA (i.e., FA#2) in the same cell. The different FA information may include a DL center frequency (or FA index) of the FA and a preamble index.

In step 707, the first MAC unit 72 of the MS analyzes the NBR-ADV message received from the BS, and provides the different FA information of the BS to the MFSE 71. In step 709, the MFSE 71 delivers the different FA information of the BS to a second MAC unit 73.

In step 711, the second MAC unit 73 also obtains synchronization of a second FA unit 75 by using the different FA information, and performs the predetermined N/W entry process to establish a traffic connection. During the N/W entry process, the second MAC unit 73 transmits the aforementioned SBC-REQ message to the BS.

Upon completing the N/W entry process, in step 713, the first MAC unit 72 delivers an N/W_Entry_Finish signal to the MFSE 71. In step 715, the second MAC unit 73 delivers the NW_Entry_Finish signal to the MFSE 71.

After establishing the traffic connections respectively by the first MAC unit 72 and the second MAC unit 73, in step 717, the first MAC unit 72 exchanges traffic with the first FA unit 74 of the BS, and the second MAC unit 73 exchanges traffic with the second FA unit 75 of the BS.

Table 1 below illustrates an example of TLV included in the SBC-REQ message to indicate whether multi-FA is supported and also to indicate a different MAC address of the same MS during the processes of FIG. 5 to FIG. 7.

TABLE 1

| Type | Length | Value | Scope | Description |
|---|---|---|---|---|
| 180 | 1 | Bit #0: Multi-FA Capability supported<br>Bit #1~#7: Reserved | SBC-REQ<br>SBC-RSP | |
| 181 | 6 | MAC Address | SBC-REQ<br>SBC-RSP | 48-bit MAC address |

Table 2 and Table 3 below illustrate an example of TLV included in the DCD message or the SBC-RSP message to indicate the different FA information of the BS

TABLE 2

| Type | Length | Value | Scope | Description |
|---|---|---|---|---|
| 182 | 5 | Bit #0~31: DL Center Frequency(KHz)<br>Bit #32~39: Preamble Index | SBC-RSP or DCD | For the SCa and OFDMA PHY preamble Index defines the PHY specific preamble.<br>For the OFDM PHY the 5LSB of Preamble Index contain the active DL subchannel index.<br>The 3 MSB of Preamble Index shall be reserved and set to 0b000. |

TABLE 3

| Type | Length | Value | Scope | Description |
|---|---|---|---|---|
| 183 | 2 | Bit #0~7: FA Index<br>Bit #32~39: Preamble Index | SBC-RSP or DCD | FA Index (Frequency Assignment Index) is present only the FA Index Indicator in PHY Profile ID is set. Otherwise, the neighbor BS has the same FA Index or the center frequency is indicated using the TLV encoded information.<br>The description about Preamble Index is the same as above. |

Since the MS can obtain the different FA information of the same cell by using the NBR-ADV message under the current standard, there is no need to define the TLV with respect to the NBR-ADV message.

Figure 8:
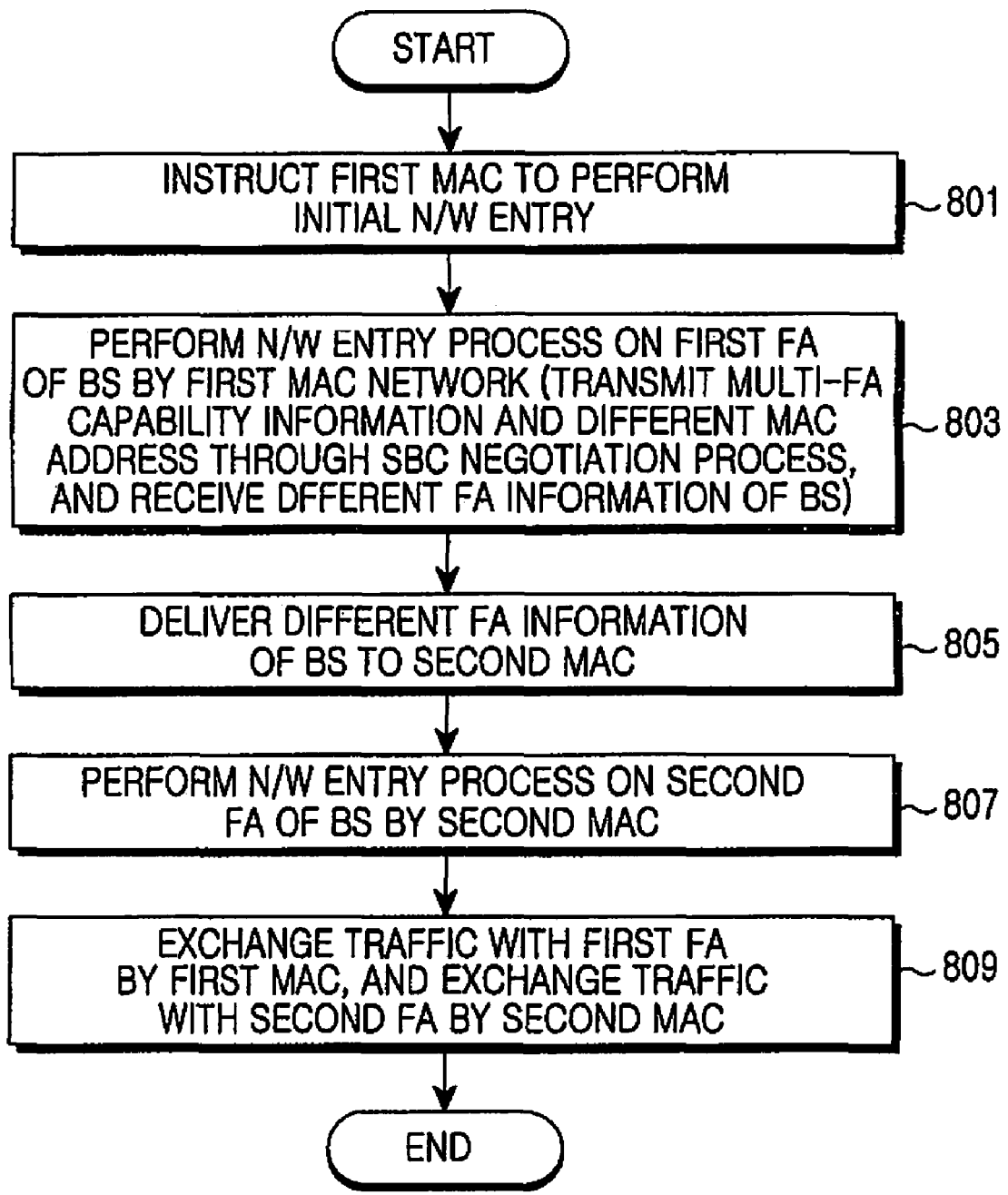
FIG. 8 is a flowchart illustrating an operation of an MS, corresponding to the process of FIG. 5.

FIG. 8 is a flowchart illustrating an operation of an MS, corresponding to the process of FIG. 5.

Referring to FIG. 8, the MS instructs the first MAC unit 52 to perform initial network entry in step 801. In step 803, the first MAC unit 52 of the MS obtains synchronization of the first FA unit 54 of the BS according to the instruction, and performs the network entry process with the first FA unit 54 to establish a traffic connection. The network entry process includes an initial ranging process, an SBC negotiation process, a registration process, a PKM negotiation process, and a DSA process. The first MAC unit 52 of the MS transmits multi-FA capability information and a different MAC address to the BS through the SBC negotiation process, and receives information on a different FA from the BS.

Upon receiving the different FA information of the BS, in step 805, the MS delivers the different FA information to the second MAC unit 53. In step 807, the second MAC unit 53 of the MS obtains synchronization of the second FA unit 55 of the BS by using the different FA information, and performs the network entry process with the second FA unit 55 to establish a traffic connection. The second MAC unit 53 of the MS transmits multi-FA capability information and a different MAC address to the BS through the SBC negotiation process, and receives the different FA information from the BS.

In step 809, the MS exchanges a first traffic through the connection established between the first MAC unit 52 and the first FA unit 54 of the BS, and exchanges a second traffic through the connection established between the second MAC unit 53 and the second FA unit 55 of the BS.

Figure 9:
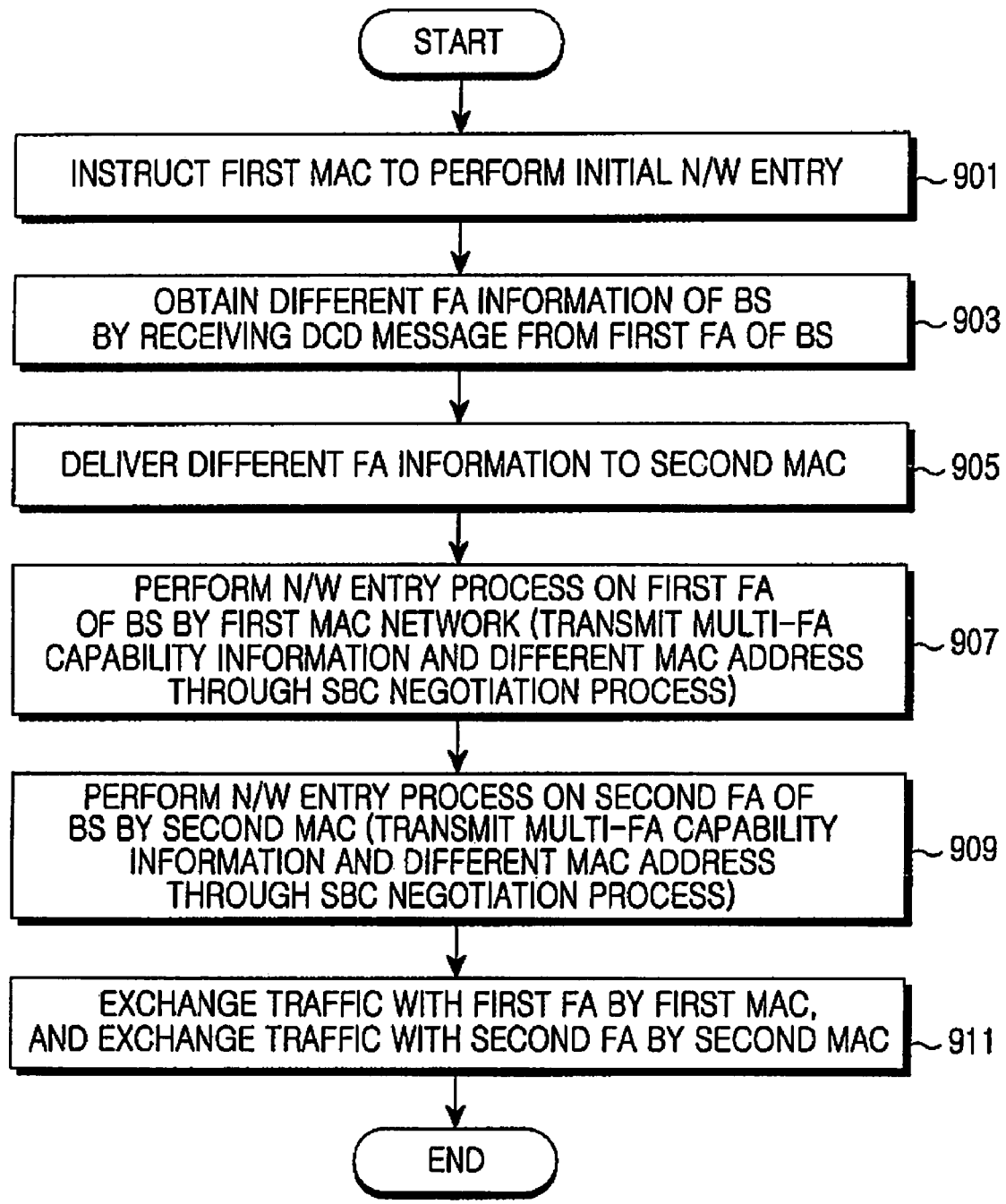
FIG. 9 is a flowchart illustrating an operation of an MS, corresponding to the process of FIG. 6.

FIG. 9 is a flowchart illustrating an operation of an MS, corresponding to the process of FIG. 6.

Referring to FIG. 9, the MS instructs the first MAC unit 62 to perform initial network entry in step 901. In step 903, the first MAC unit 62 of the MS obtains synchronization of the first FA unit 64 of the BS according to the instruction, receives a DCD message from the first FA unit 64 so as to obtain information on a different FA of the BS. The different FA information may include a DL center frequency (or an FA index) of the FA and a preamble index.

Upon obtaining the different FA information of the BS, in step 905, the MS delivers the different FA information to the second MAC unit 63.

In step 907, the first MAC unit 62 of the MS performs the network entry process with the first FA unit 64 to establish a traffic connection. The network entry process includes an initial ranging process, an SBC negotiation process, a registration process, a PKM process, and a DSA process. The first MAC unit 62 of the MS transmits multi-FA capability information and a different MAC address to the BS through the SBC negotiation process.

In step 909, the second MAC unit 63 of the MS also obtains synchronization of the second FA unit 65 of the BS by using the different FA information, and performs the network entry process with the second FA unit 65 to establish a traffic connection. The second MAC unit 63 of the MS transmits multi-FA capability information and a different MAC address to the BS through the SBC negotiation process.

In step 911, the MS exchanges a first traffic through the connection established between the first MAC unit 62 and the first FA unit 64 of the BS, and exchanges a second traffic through the connection established between the second MAC unit 63 and the second FA unit 65 of the BS.

Figure 10:
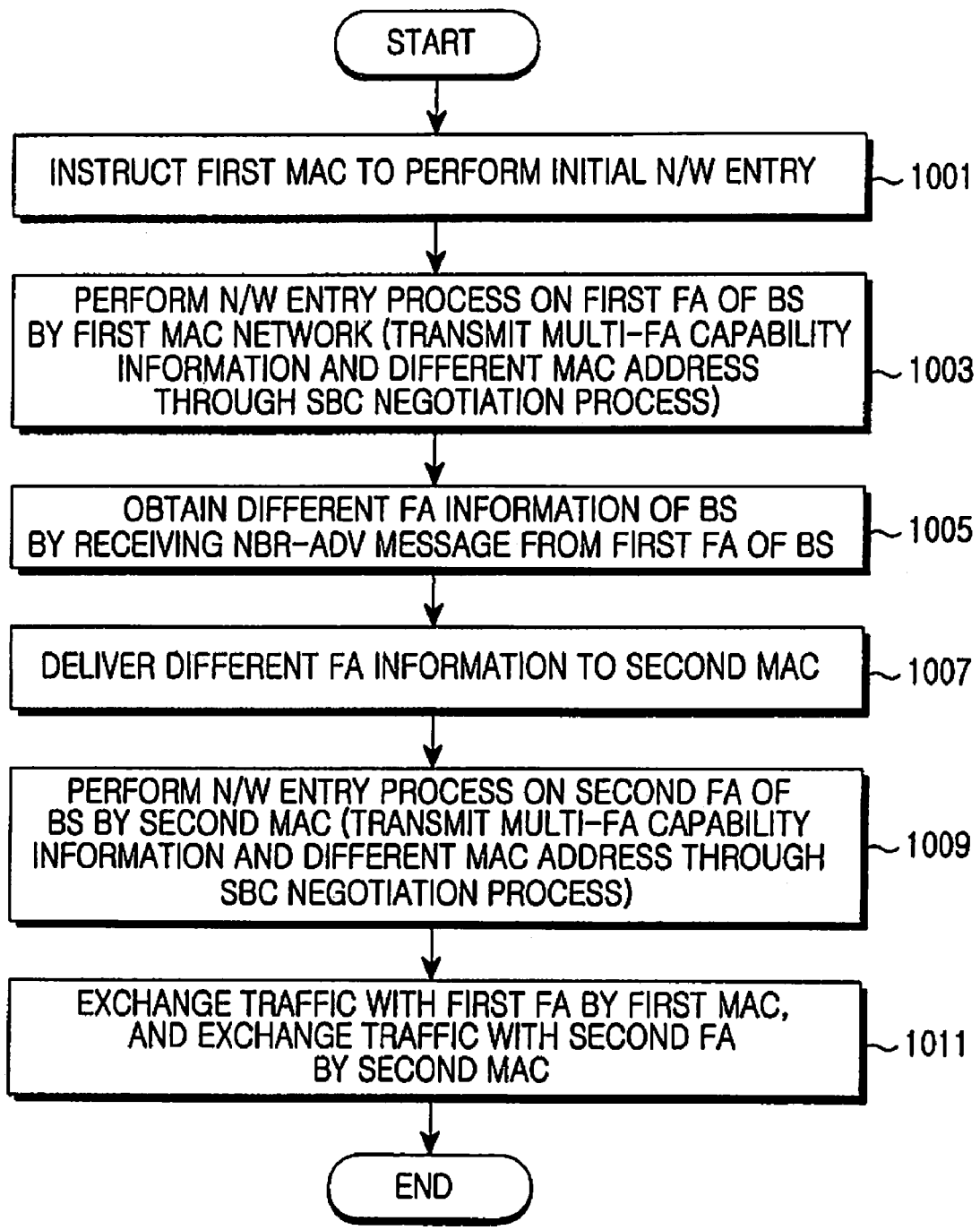
FIG. 10 is a flowchart illustrating an operation of an MS, corresponding to the process of FIG. 7.

FIG. 10 is a flowchart illustrating an operation of an MS, corresponding to the process of FIG. 7.

Referring to FIG. 10, the MS instructs the first MAC unit 72 to perform initial network entry in step 1001. In step 1003, the first MAC unit 72 of the MS obtains synchronization of the first FA unit 74 of the BS according to the instruction, and performs the network entry process with the first FA unit 74 to establish a traffic connection. The network entry process includes an initial ranging process, an SBC negotiation process, a registration process, a PKM negotiation process, and a DSA process. The first MAC unit 72 of the MS transmits multi-FA capability information and a different MAC address to the BS through the SBC negotiation process.

In step 1005, the MS receives an NBR-ADV message from the first FA unit 74 of the BS and obtains the different FA information of the BS. The different FA information may include a DL center frequency (or an FA index) of the FA and a preamble index.

Upon obtaining the different FA information of the BS, in step 1007, the MS delivers the different FA information to the second MAC unit 73. In step 1009, the second MAC unit 73 of the MS obtains synchronization of the second FA unit 75 of the BS by using the different FA information, and performs the network entry process with the second FA unit 75 to establish a traffic connection. The second MAC unit 73 of the MS transmits multi-FA capability information and a different MAC address to the BS through the SBC negotiation process.

In step 1011, the MS exchanges a first traffic through the connection established between the first MAC unit 72 and the first FA unit 74 of the BS, and exchanges a second traffic through the connection established between the second MAC unit 73 and the second FA unit 75 of the BS.

The network entry process of the MS supporting multiple FAs in the broadband wireless communication system has been described above. Hereinafter, structures of a BS and an MS included in the broadband wireless communication system will be described. As described above with reference to FIG. 4, the BS and the MS have the same structure when protocol stack configurations thereof are the same. Thus, the structures of the BS and the MS will be described hereinafter by taking either one of the BS and the MS for example.

Figure 11:
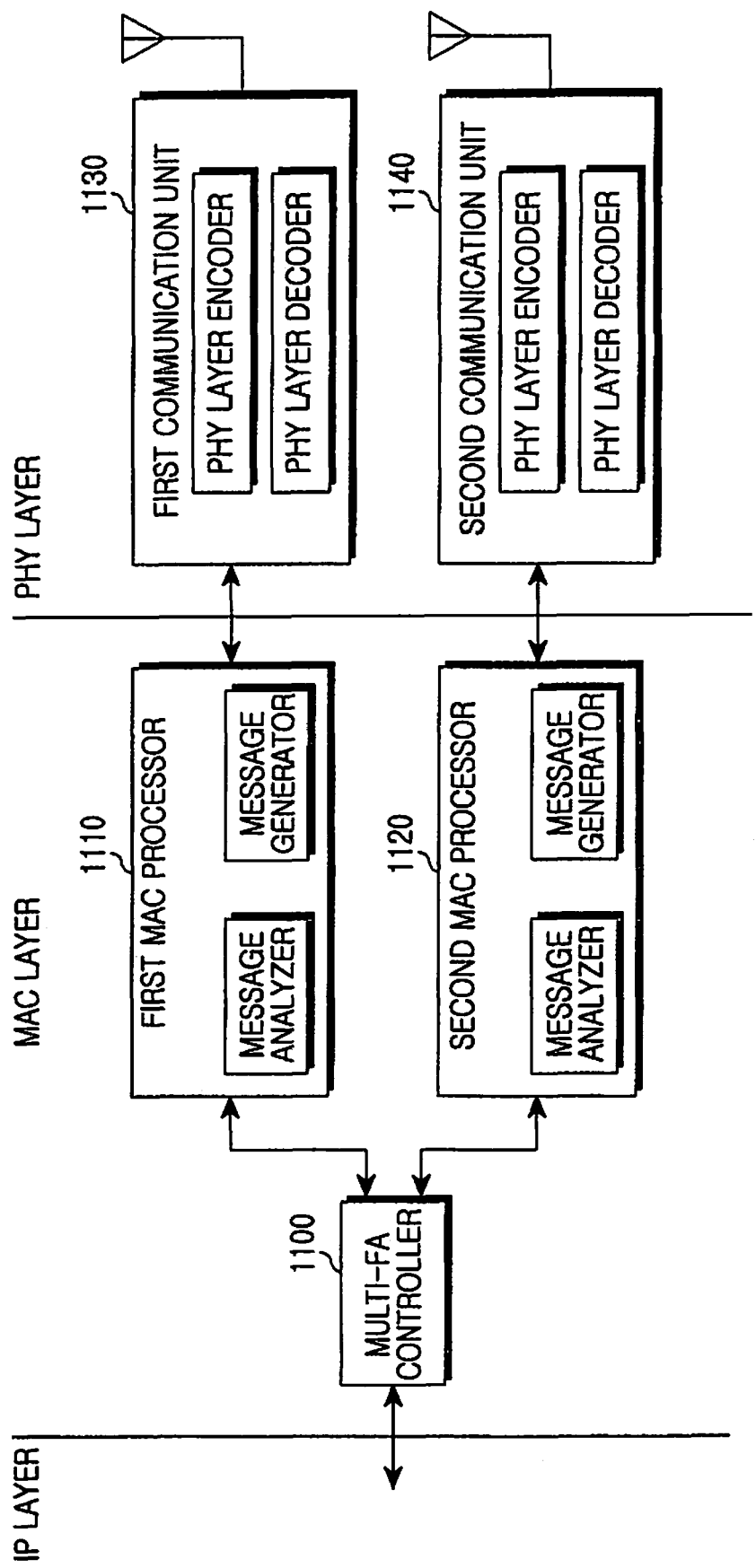
FIG. 11 is a block diagram of an MS (or a Base Station (BS)) supporting multiple FAs in a wideband wireless communication system according to the present invention.

FIG. 11 is a block diagram of an MS (or a BS) supporting multiple FAs in a broadband wireless communication system according to the present invention.

Referring to FIG. 11, under the assumption that the number of FAs is two, the MS includes a multi-FA controller 1100, a first MAC processor 1110, a second MAC processor 1120, a first communication unit 1130, and a second communication unit 1140. It is assumed herein that the multi-FA controller 1100, the first MAC processor 1110, and the second MAC processor 1120 belong to a MAC layer, and the first communication unit 1130 and the second communication unit 1140 belong to a PHY layer.

A transmission operation will first be explained. The multi-FA controller 1100 fragments an MAC Service Data Unit (SDU) (i.e., IP packet) transmitted from an IP layer and distributes the fragments to the first MAC processor 1110 and the second MAC processor 1120 according to a predetermined rule. The distributed fragments may be traffic data for one Service Flow (SF) or traffic data for a plurality of SFs. Further, the multi-FA controller 1100 may equally distribute the fragments or may unequally distribute the fragments according to a state (e.g., load state) of each FA. The IP packet may be distributed by fragmentation as described above. Alternatively, however, the IP packet may be distributed in a switching manner without fragmentation.

The first MAC processor 1110 gathers the fragments received from the multi-FA controller 1100, generates MAC PDUs by appending a header and an error checking code (ie., CRC code), forms frame data by sorting the generated MAC PDUs, and transmits the frame data to the PHY layer. For the same SF, a Connection ID (CID) recorded to the MAC PDU by the first MAC processor 1110 may be different from or equal to a CID recorded to the MAC PDU by the second MAC processor 1120. Further, the first MAC processor 1110 performs a function for generating and analyzing an MAC layer control message (i.e., a signaling message, MAC management message).

The second MAC processor 1120 has an MAC address different from that of the first MAC processor 1110, and performs the same reception process as the first MAC processor 1110.

According to a predetermined rule, the first communication unit 1130 performs physical-layer encoding on data received from the corresponding first MAC processor 1110. For example, the first communication unit 1130 codes and modulates the data received from the first MAC processor 1110 according to a predetermined Modulation & Coding Scheme (MCS) level, and performs OFDM modulation on the data by using Inverse Fast Fourier Transform (IFFT). Further, the first communication unit 1130 converts baseband data into an analog signal, converts the baseband analog signal into an RF signal corresponding to one FA (e.g., first FA) of the two FAs for multi-FA communication, and transmits the RF signal through an antenna. Such a process is provided in consideration of an OFDM system. Thus, when using a CDMA system, the OFDM modulation may be replaced with code spreading modulation.

According to a predetermined rule, the second communication unit 1140 performs physical-layer encoding on data received from the corresponding second MAC processor 1120. In this case, the second communication unit 1140 converts a baseband signal into an RF signal corresponding to the other FA (e.g., second FA) of the two FAs for multi-FA communication, and transmits the RF signal through an antenna.

A reception operation will now be described. The first communication unit 1130 performs physical-layer decoding on a signal received through an antenna and then transmits the signal to the corresponding first MAC processor 1110. For example, the first communication unit 1130 filters a signal received through an antenna to obtain a signal corresponding to the first FA, converts the obtained signal into baseband sample data, performs OFDM demodulation on the sample data, demodulates and decodes the OFDM-demodulated data according to a predetermined MCS level to restore an information bit-steam.

The second communication unit 1140 performs physical-layer decoding on a signal received through an antenna, and transmits the signal to the corresponding second MAC processor 1120. The second communication unit 1140 filters the received signal to obtain a signal corresponding to the second FA, converts the obtained signal into a baseband signal, and delivers the baseband signal to the second MAC processor 1120.

The first MAC processor 1110 extracts an MAC Packet Data Unit (PDU) from data received from the corresponding first communication unit 1130, and performs header and error checking on the extracted MAC PDU. In this case, if a control message (i.e., a signaling message) is determined as a result of the header checking, the first MAC processor 1110 performs a predetermined process, and if traffic is determined, the first MAC processor 1110 performs error checking and provides the error checking result to the multi-FA controller 1100. The second MAC processor 1120 has an MAC address different from that of the first MAC processor 1110, and performs the same reception process as the first MAC processor 1110.

The multi-FA controller 1100 maps and manages IP addresses obtained through a representative MAC address among a plurality of MAC addresses for multi-FA communication and a plurality of CIDs for multi-FA communication. Thus, the multi-FA controller 1100 can integrate MAC PDUs having different CIDs and delivered from the plurality of MAC processes 1110 and 1120 into one IP address. That is, the multi-FA controller 1100 assembles the MAC PDUs having different CIDs into one SDU (i.e., IP packet), and delivers the resultant data to its superordinate layer (e.g., IP layer).

According to the present invention, the multi-FA controller 1100 provides control such that the first MAC processor 1110 and the second MAC processor 1120 connect using different FAs in the same cell during initial network entry.

Now, operations of a BS and an MS will be described with reference to FIG. 11 according to the present invention.

The operation of the MS will first be described. During initial network entry, the multi-FA controller 1100 instructs one of the MAC processors 1110 and 1120 to perform the initial network entry. It is assumed herein that the first MAC processor 1110 is instructed to perform the initial network entry. Then, the first MAC processor 1110 attempts to access to the BS using an FA recognized by the first communication unit 1130. It is assumed herein that the recognized FA is a first FA of the BS. Further, the first MAC processor 1110 obtains information on a different FA (i.e., second FA) of the BS by analyzing an SBC-RSP message, a DCD message, or an NBR-ADV message, each of which is received using the first FA of the BS, and delivers the different FA information to the multi-FA controller 1100. Furthermore, by using one message (e.g., SBC-REQ) among a plurality of messages transmitted to the BS during the network entry process, the first MAC processor 1110 transmits, to the BS, information indicating whether multi-FA is supported by the MS and a different MAC address (i.e., an MAC address of the first MAC processor 1110) of the MS.

The multi-FA controller 1100 delivers the different FA information received from the first MAC processor 1110 to the second MAC processor 1120. Then, the second MAC processor 1120 performs the network entry process with the BS by using the different FA information. That is, the second MAC processor 1120 provides control such that the corresponding second communication unit 1140 connects to the BS using the second FA, and thereafter exchanges a signaling message to perform the network entry process. The second MAC processor 1120 transmits, to the BS, information indicating whether multi-FA is supported by the MS and a different MAC address (i.e., an MAC address of the first MAC processor 1110) of the MS by using one message (e.g., SBC-REQ) among the plurality of messages transmitted to the BS during the network entry process.

The operation of the BS will now be described. Basically, the first MAC processor 1110 and the second MAC processor 1120 have different MAC addresses and independently operate. It is assumed herein that, among the two FAs for multi-FA communication, the first MAC processor 1110 and the first communication unit 1130 are using the first FA, and the second MAC processor 1120 and the second communication unit 1140 are using the second FA.

The first MAC processor 1110 generates a message to report different FA information for multi-FA communication to an MS connected using the first FA, and delivers the message to the first communication unit 1130. Then, the first communication unit 1130 processes the message received from the first MAC processor 1110 so that the message has a transmittable format, and then transmits the message. The message including the different FA information may be one message (e.g., SBC-RSP) among messages transmitted to the MS during the network entry process, a DCD message which is broadcast with a periodic interval, or an NBR-ADV message which is broadcast with a periodic interval.

In addition, during the network entry process on the MS connected using the first FA, the first MAC processor 1110 receives and processes a message (e.g., SBC-REQ) including information indicating whether multi-FA is supported by the MS and a different MAC address of the MS, and provides a plurality of MAC addresses corresponding to the MS to the multi-FA controller 1100.

Likewise, the second MAC processor 1120 generates a message (i.e., SBC-RSP or DCD or NBR-ADV) to report information on a different FA (i.e., first FA) for multi-FA communication to an MS connected using the second FA, and delivers the message to the second communication unit 1140. Then, the second communication unit 1140 processes the message received from the second MAC processor 1120 so that the message has a transmittable format, and then transmits the message. In addition, during the network entry process on the MS connected using the second FA, the second MAC processor 1120 receives and processes a message (e.g., SBC-REQ) including information indicating whether the multi-FA is supported by the MS and a different MAC address of the MS, and provides a plurality of MAC addresses corresponding to the MS to the multi-FA controller 1100.

The multi-FA controller 1100 maps and manages different MAC addresses corresponding to the MS and delivered from the MAC processors 1110 and 1120. Thus, the BS can manage the different MAC addresses of the same MS. Further, in management, the BS maps IP addresses assigned to the MS and a plurality of CIDs assigned to the MS for multi-FA communication.

According to the present invention, an MS using a wide bandwidth is supported by using a frequency overlay scheme in a broadband wireless communication system. Thus, there is an advantage in that the system can effectively support a legacy MS and a new MS in a bandwidth change process. In particular, when an MS having a plurality of MAC addresses connects to a system that performs communication through multiple FAs, different MACs of the MS can perform initial network entry on different FAs in the same cell (or sector or BS) without collisions.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is;

1. A Mobile Station (MS) apparatus in a broadband wireless communication system supporting MSs each using different bandwidths, the apparatus comprising:
   a multi-Frequency Allocation (FA) controller for controlling a plurality of Media Access Control (MAC) processors to connect using different FAs of a Base Station (BS);
   a first MAC processor for first attempting to connect using a first FA of the BS under the control of the multi-FA controller and for obtaining information on a different FA of the BS by analyzing a message received over the first FA; and
   a second MAC processor for connecting using a second FA of the BS according to the different FA information.

2. The apparatus of claim 1, wherein the message including the different FA information of the BS is any one of a message for performing basic capability negotiation of the MS, a message for broadcasting Downlink Channel Descriptor (DCD) information, and a message for broadcasting neighbor BS information.

3. The apparatus of claim 1, wherein the MAC processors each have different MAC addresses.

4. The apparatus of claim 1, wherein the MAC processors each transmit multi-FA capability information and a different MAC address to the BS through one of messages exchanged during a network entry process.

5. The apparatus of claim 4, wherein the MAC processors each transmit the multi-FA capability information and the different MAC address to the BS through the message for performing basic capability negotiation of the MS.

6. The apparatus of claim 1, further comprising a plurality of communication units, corresponding to the respective MAC processors and using different FAs, for performing physical-layer processing on a signal to be transmitted or received.

7. The apparatus of claim 1, wherein the different FA information of the BS is at least one of a downlink center frequency, an FA index, and a preamble index.

8. A Base Station (BS) apparatus in a broadband wireless communication system supporting Mobile Stations (MSs) each using different bandwidths, the apparatus comprising:
   a plurality of communication units for independently performing physical-layer processing using different Frequency Allocations (FAs);
   a plurality of Media Access Control (MAC) processors, corresponding to the respective communication units and having different MAC addresses, for obtain multi-FA capability information and a different MAC address of an MS by analyzing a message received from the MS connected using a specific FA; and
   a multi-FA controller for mapping and managing a plurality of MAC addresses belong to the same MS and provided from the MAC processors.

9. The apparatus of claim 8, wherein the message including the multi-FA capability information and the different MAC address of the MS is one of messages exchanged during a network entry process.

10. The apparatus of claim 9, wherein the message including the multi-FA capability information and the different MAC address of the MS is a message exchanged for basis capability negotiation of the MS.

11. The apparatus of claim 8, wherein the MAC processors each transmit, to the MS, information on a different FA other than the FA connected with the MS by using any one of a message for performing basic capability negotiation of the MS, a message for broadcasting Downlink Channel Descriptor (DCD) information, and a message for broadcasting neighbor BS information.

12. The apparatus of claim 11, wherein the different FA information includes at least one of a downlink center frequency, an FA index, and a preamble index.

13. A communication method of a Mobile Station (MS) in a broadband wireless communication system supporting MSs each using different bandwidths, the method comprising:
   performing a network entry process using an arbitrary Frequency Allocation (FA) of a Base Station (BS) by one of a plurality of Media Access Control (MAC) processors for multi-FA communication;
   obtaining information on a different FA of the BS by analyzing a message received using the arbitrary FA; and
   performing the network entry process using the different FA of the BS by one or more of the remaining MAC processors according to the different FA information.

14. The method of claim 13, further comprising exchanging a plurality of traffics by the MAC processors through a plurality of connections established independently.

15. The method of claim 14, further comprising mapping the plurality of traffics received through the plurality of connections to one Internet Protocol (IP) address.

16. The method of claim 13, further comprising transmitting multi-FA capability information and one or more different MAC addresses of the MS to the BS during the network entry process.

17. The method of claim 16, wherein the multi-FA capability information and the different MAC address of the MS are transmitted to the BS through a message for performing basic capability negotiation of the MS.

18. The method of claim 13, wherein the information on the different FA of the BS is obtained from a message exchanged for the capability negotiation of the MS.

19. The method of claim 13, wherein the information on the different FA of the BS is obtained from a message for broadcasting Downlink Channel Description (DCD) information.

20. The method of claim 13, wherein the information on the different FA of the BS is obtained from a message for broadcasting neighbor BS information.

21. The method of claim 14, wherein the MAC processors each have different MAC addresses.

22. A communication method in a broadband wireless communication system supporting Mobile Stations (MSs) each using different bandwidths, the method comprising:
   broadcasting, by a Base Station (BS), a Downlink Channel Descriptor (DCD) message including information on a different Frequency Allocation (FA) of the BS using all FAs;
   connecting, by one of a plurality of Media Access Control (MAC) processors of the MS, using an arbitrary FA of the BS;

obtaining, by the MS, information on the different FA of the BS by analyzing the DCD message received using the arbitrary FA; and performing, by one or more of the remaining MAC processors of the MS, a network entry process using the different FA of the BS according to the different FA information.

23. The method of claim 22, further comprising exchanging a plurality of traffics by the MAC processors of the MS through a plurality of connections established independently.

24. The method of claim 23, further comprising mapping the plurality of traffics received through the plurality of connections to one Internet Protocol (IP) address.

25. The method of claim 22, further comprising transmitting, by the respective MAC processors of the MS, multi-FA capability information and a different MAC address of the MS to the BS during the network entry process.

26. The method of claim 25, wherein the multi-FA capability information and the different MAC address of the MS are transmitted to the BS through the message for performing the basic capability negotiation of the MS.

27. The method of claim 22, wherein the different FA information of the BS includes at least one of a downlink center frequency, an FA index, and a preamble index.

28. A communication method of a Base Station (BS) in a broadband wireless communication system supporting Mobile Stations (MSs) each using different bandwidths, the method comprising:

obtaining, by a plurality of Media Access Control (MAC) processors, multi-FA capability information and a different MAC address of the MS by analyzing a message received from the MS; and mapping and managing a plurality of MAC addresses of the MS.

29. The method of claim 28, wherein the message including the multi-FA capability information and the different MAC address of the MS is one of messages exchanged during a network entry process.

30. The method of claim 28, further comprising transmitting, by the MAC processors, information on a different FA of the BS to the MS.

31. The method of claim 30, wherein the message including the information on the different FA is any one of a message for performing basic capability negotiation of the MS, a message for broadcasting Downlink Channel Descriptor (DCD) information, and a message for broadcasting neighbor BS information.

32. A Mobile Station (MS) apparatus in a broadband wireless communication system supporting MSs each using different bandwidths, the apparatus comprising:

a plurality of MAC processors, each having different MAC addresses, for establishing connections independently by connecting using two or more Frequency Allocations (FAs) of the BS for multi-FA communication; and a multi-FA controller for providing control such that the MAC processors connect using different FAs of the same BS.

33. The apparatus of claim 32, wherein a specific MAC processor among the MAC processors first attempts to connect using an arbitrary FA of the BS under the control of the multi-FA controller, and obtains information on the different FA of the BS by analyzing a message received using the arbitrary FA.

34. The apparatus of claim 33, wherein the multi-FA controller controls connection of the remaining MAC processors by using the information regarding on the different FA of the BS and obtained by the specific MAC processor.

35. The apparatus of claim 33, wherein the message including the information on the different FA of the BS is any one of a message for performing basic capability negotiation of the MS, a message for broadcasting Downlink Channel Descriptor (DCD) information, and a message for broadcasting neighbor BS information.

36. The apparatus of claim 32, wherein the MAC processors each transmit multi-FA capability information and a different MAC address to the BS by using one of messages exchanged during a network entry process.

37. The apparatus of claim 32, further comprising a plurality of communication units, corresponding to the respective MAC processors and each using different FAs, for performing physical-layer processing on a signal to be transmitted or received.

* * * * *